(12) United States Patent
Kelleher et al.

(10) Patent No.: US 7,160,567 B2
(45) Date of Patent: *Jan. 9, 2007

(54) PROCESS FOR RETAINING MOISTURE IN COOKED FOOD WITH A PEPTIDE

(75) Inventors: Stephen D. Kelleher, Wakefield, MA (US); Peter G. Williamson, Gloucester, MA (US)

(73) Assignee: Proteus Industries, Inc., Gloucester, MA (US)

( * ) Notice: Subject to any disclaimer, the term of this patent is extended or adjusted under 35 U.S.C. 154(b) by 129 days.

This patent is subject to a terminal disclaimer.

(21) Appl. No.: 10/976,433

(22) Filed: Oct. 29, 2004

(65) Prior Publication Data

US 2005/0064085 A1 Mar. 24, 2005

Related U.S. Application Data

(63) Continuation-in-part of application No. 10/378,139, filed on Mar. 4, 2003, now Pat. No. 6,855,364, which is a continuation-in-part of application No. 10/252,873, filed on Sep. 24, 2002, now abandoned.

(51) Int. Cl.
*A23L 1/314* (2006.01)

(52) U.S. Cl. ............... 426/281; 426/641; 426/643; 426/644; 426/646; 426/657

(58) Field of Classification Search ............. 426/92, 426/281, 641, 643, 644, 646, 657
See application file for complete search history.

(56) References Cited

U.S. PATENT DOCUMENTS

| | | | |
|---|---|---|---|
| 3,989,847 A | 11/1976 | Kurihara et al. | 426/7 |
| 6,005,073 A | 12/1999 | Hultin et al. | 530/412 |
| 6,136,959 A | 10/2000 | Hultin et al. | 530/412 |
| 6,288,216 B1 | 9/2001 | Hultin et al. | 530/412 |
| 6,451,975 B1 | 9/2002 | Hultin et al. | 530/350 |

FOREIGN PATENT DOCUMENTS

GB 2048051 12/1980

OTHER PUBLICATIONS

Onodenalore et al., Journal of Aquatic Food Product Technology, vol. 5(4) (1996), pp. 43-59.

Chawla et al., Journal of Food Science, vol. 61, No. 2, (1996), pp. 362-366, 371.

Venugopal et al., Thermostable Water Dispersions of Myofibrilla Protein from Atlantic Mackerel, (*Scomber scrobus* 7), Journal of Food Science, vol. 59, No. 2, pp. 265-276.

Cuq et al., Edible Packaging Films based on Fish Myofibrilla Proteins: Formulation and Functional Properties, Journal of Food Science, vol. 60, No. 6, pp. 1369-1374.

Shahidi et al., Notes & Digests, Meat Focus International-Oct. (1983), pp. 443-445.

FSTA #1, Yang, FSTA AN #95(02): 50115, 1994.
FSTA #2, Salam, FSTA AN #94(12): 50080, 1994.
FSTA #3, Han-Ching, FSTA AN #94(04): R0024, 1993.
FSTA #4, Chen, FSTA AN #92(12): 50138, 1991.
FSTA #5, Liu, FSTA AN #92(12): 50137, 1991.
FSTA #6, Pan, FSTA AN #92(12): 50136, 1991.
FSTA #7, Yang, FSTA AN #92(02) 50118, 1992.
FSTA #8, Kee, FSTA AN #92(02): 50122.

Onodenalore, et al., Protein Dispersions & Hydrolysates from Shark:, FSTA ABS #97(04): R0032, (1996).

Shahidi et al., "Water Dispersions of Myofibrillar Proteins From Capelin (*Mallotus villosum*)", Food Chemistry 53 (1995) pp. 51-54.

Shahidi et al., Sollubilization and Thermostability of Water Dispersions of Muscle Structured Proteins of Atlantic Herring (*Clupea horengus*), Journal of Agriculre Food Chemistry, vol. 42, No. 7, (1994), pp. 1440-1446.

"Sigma" catolog, 1995, p. 710.

Meinke et al., Some Factors Influencing The Production of Protein Isolates From Whole Fish, Journal of Food Science, vol. 37, (1972), pp. 195-198.

Meinke et al., Autolysis as a Factor in the Production of Protein Isolates From Whole Fish, Journal of Food Science, vol. 38, (1973), pp. 864-866.

*Primary Examiner*—Arthur L. Corbin
(74) *Attorney, Agent, or Firm*—Paul J. Cook

(57) ABSTRACT

A peptide composition derived from a protein composition when added to uncooked food effects moisture retention during cooking of the food. The peptide composition is derived from a dry protein mixture or an aqueous acidic protein solution which, in turn, is derived from animal muscle tissue. The peptide composition is added to uncooked poultry, meat or fish prior to cooking. The dry protein mixture and aqueous acidic protein solution comprise myofibrillar proteins and sarcoplasmic proteins substantially free of myofibrils and sarcomeres.

74 Claims, No Drawings

PROCESS FOR RETAINING MOISTURE IN COOKED FOOD WITH A PEPTIDE

REFERENCE TO RELATED APPLICATION

This application is a continuation-in-part application of Ser. No. 10/378,139, filed Mar. 4, 2003, now U.S. Pat. No. 6,855,364, issued Feb. 15, 2005 which, in turn is a continuation-in-part of application Ser. No. 10/252,873, filed Sep. 24, 2002, now abandoned.

BACKGROUND OF THE INVENTION

This invention relates to a process for retaining liquid in cooked food. More particularly, this invention relates to such a process which utilizes a peptide composition derived from animal muscle protein to retain moisture in food and to the food product utilized in the process.

Prior to the present invention, meat or fish cooked at an elevated temperature loses its moisture to the surrounding atmosphere. In so doing, the cooked meat or fish undesirably loses its natural or added flavors so that it becomes less tasteful. Fluid loss during cooking of meat or fish can range up to 30% to 40% by weight based upon the weight of the meat or fish prior to cooking. A prior solution for retaining moisture in the meat or fish without additives took the form of wrapping the meat or fish in a solid moisture barrier such as aluminum foil. This solution is undesirable since the surface of the meat or fish remains soft rather than having a desirable crust.

Prior attempts to retain moisture in cooked meat or fish with additives have included the use of sodium tripolyphosphate, a coating of fat free flour, based, batter containing an egg white substitute (U.K. Patent Application 2,097,646), water-in-oil emulsion (U.S. Pat. No. 3,406,081), protein or protein isolate and a fat (U.S. Pat. Nos. 4,031,261 and 4,935,251), milk solids (U.S. Pat. No. 2,282,801) and lecithin (U.S. Pat. Nos. 2,470,281 and 3,451,826).

Accordingly, it would be desirable to provide a form of fish, meat or vegetable which can be cooked while retaining its moisture and natural or added flavors without the use of a solid moisture barrier so that the surface of the cooked meat, fish or vegetable could become crusty during cooking. In addition, it would be desirable to provide such a form of fish, meat or vegetable which is not less nutritional than the original fish, meat or vegetable or which is even more nutritional than the original fish, meat or vegetable to be cooked. In addition, it would be desirable to provide such a form of fish, meat or vegetable wherein the majority of moisture or added flavors or spices in the uncooked fish, meat or vegetable are retained during cooking.

SUMMARY OF THE INVENTION

In accordance with this invention, animal muscle tissue or vegetable to be cooked is coated or admixed or injected with a dry peptide mixture or an aqueous acidic peptide solution each derived from a protein composition which, in turn, is derived from a mixture of myofibrillar proteins and sarcoplasmic proteins. The mixture of myofibrillar proteins and sarcoplasmic protein is derived from animal muscle tissue. The protein composition derived from animal muscle tissue is obtained by one of the processes disclosed in U.S. Pat. Nos. 6,005,073; 6,288,216; 6,136,959 and/or 6,451,975 all of which are incorporated herein by reference in their entirety. By the phrase, "dry peptide mixture" as used herein is meant a dehydrated, peptide mixture derived from a mixture of myofibrillar proteins and sarcoplasmic proteins which, in turn, is derived from animal muscle tissue and which is obtained from an aqueous acid solution (less than or equal to pH 4.5) or an aqueous alkaline solution (greater than or equal to pH 10.5) and having a final pH of about 4.5 or less or between pH 6.5 and 8.5. The dry peptide mixture also contains less than about 15 weight percent water, preferably between about 3 and 10 weight percent water and most preferably between about 3 and 7 weight percent water based on the total weight of the peptide mixture and water. While a dry peptide mixture containing 0% water is useful in the present invention, dry powders, in general, containing 0 to 3 weight percent water can be dangerous on a commercial scale. Solid mixtures of a peptide mixture derived from myofibrillar proteins and sarcoplasmic proteins containing greater than about 15 weight percent water based on total weight of the peptide mixture and water are undesirable in this invention since they are microbially unsound. In addition, it has been found that a mixture of peptides derived from myofibrillar proteins and sarcoplasmic proteins derived from animal muscle tissues having a pH greater than 4.5 to about 6.5 are not useful in the present invention since they do not retain significant moisture in cooked meat, fish or vegetables. Peptides directly derived from solutions having a pH of 8.5 or above are less preferred in the present invention. However, the acidic peptide compositions are preferred for use in the present invention, particularly those having a pH of 3.5 or less, and most preferably a pH between about 2.5 and about 3.5.

By the phrase "aqueous acidic peptide solution" as used herein is meant an aqueous solution of peptides derived from a mixture of myofibrillar proteins and sarcoplasmic proteins, which in turn, is derived from animal muscle tissue and having a pH of 4.5 or less, preferably 3.5 or less and most preferably between about 2.5 and about 3.5 but not so low as to adversely affect the peptide functionality. The aqueous acidic peptide solution can be obtained directly from animal muscle tissue acidic protein solution by the processes described below or by dissolving the dry peptide mixture in water or in a pharmaceutically or food grade acceptable aqueous acidic solution.

The peptide composition of this invention to retain moisture in cooked foods can be utilized alone or in admixture with the mixture of myofibrillar proteins and saracoplasmic proteins derived from animal muscle tissue described herein.

In accordance with this invention the dry peptide mixture derived from a mixture of myofibrillar proteins and sarcoplasmic protein, in powder form, dehydratred form or small particulate form is applied to the surface of animal muscle tissue or vegetable to be cooked or is mixed with the animal muscle tissue (ground, minced as thinly sliced) such as hamburger or sausage or vegetable to be cooked. Alternatively, the aqueous acidic peptide solution can be injected into the muscle tissue of fish, meat or vegetable or it can be applied to the surface of the fish, meat or vegetable or it can be mixed with the fish, meat or vegetable. The fish, meat or vegetable containing the dry peptide mixture or aqueous acidic peptide solution then can be cooked at elevated temperature in the absence of a solid moisture barrier while retaining a substantial majority of its original moisture. The difference in weight between meat, fish or vegetable treated in accordance with this invention compared with fish, meat or vegetable not injected, mixed or coated with the dry peptide mixture or aqueous acidic peptide solution is between about 4 and about 21%, more usually, between about 4 and about 10%.

DESCRIPTION OF SPECIFIC EMBODIMENTS

In accordance with this invention, a food such as animal muscle, e.g., fish, meat or poultry or vegetable to be cooked is coated, admixed and/or injected with a dry peptide mixture or an aqueous acidic peptide solution derived from a mixture of myofibrillar proteins and sarcoplasmic proteins which, in turn, is derived from animal muscle tissue and obtained by the processes disclosed in U.S. Pat. Nos. 6,005,073, 6,288,216, 6,136,959 and 6,451,975 all of which are incorporated herein by reference in their entirety. A dry protein mixture which is a precursor to the peptide composition useful in the present invention is obtained by one of four processes. In two processes, (acid processes) animal muscle tissue is formed into small tissue particles which are then mixed with sufficient acid to form a solution of the tissue having a pH of 3.5 or less, but not such a low pH as to adversely modify the animal tissue protein. In one of these two processes, the solution is centrifuged to form a lowest membrane lipid layer, an intermediate layer of aqueous acidic protein solution and a top layer of neutral lipids (fats and oils). The intermediate layer of aqueous acidic protein solution then is separated from the membrane lipid layer or from both the membrane lipid layer and the neutral lipid layer. In a second of these two processes, no centrifugation step is effected since the starting animal muscle tissue contains low concentrations of undesired membrane lipids, oils and/or fats. In both processes, the protein mixture is free of myofibrils and sarcomeres. In both processes, the protein in the aqueous acidic protein solution is recovered after centrifugation (when used) by drying the aqueous acidic solution, such as by evaporation, spray drying or lyophilization to form the dry protein mixture having the low pH it had when it was dissolved in the aqueous acidic protein solution. Alternatively, the aqueous acidic protein solution can be recovered without drying. It is preferred to utilize one of these two acid processes to obtain the dry protein mixture or the aqueous acidic protein solution. In another alternative process, the protein in the aqueous acidic protein solution can be precipitated and recovered and mixed with a pharmaceutically acceptable or food grade acid to form an aqueous acidic protein solution of a desired viscosity. This latter alternative process is particularly suitable for forming an aqueous acidic protein solution which is then converted to an aqueous acidic peptide solution. The peptide composition is formed from the dry protein mixture or the aqueous acidic protein solution by mixing the dry protein composition or the aqueous protein solution with an enzyme composition which forms the peptide composition from the dry protein mixture or the aqueous acidic protein solution. The resultant aqueous acidic peptide solution can be dried such as by spray drying or lyophilization or evaporation to form a peptide powder. The peptide powder or aqueous acidic peptide solution then is added to the meat, fish or vegetable. The resultant meat, fish or vegetable containing the peptide composition retains a substantial portion of its moisture during cooking.

In two other processes, (alkaline processes) animal muscle tissue is formed into small tissue particles which are then mixed with sufficient aqueous base solution to form a solution of the tissue wherein at least 75% of the animal muscle protein is solubilized, but not such a high pH as to adversely modify the animal tissue protein. In one process, the solution is centrifuged to form a lowest membrane lipid layer, an intermediate aqueous protein rich layer and a top layer of neutral lipids (fats and oils). The intermediate aqueous protein-rich layer then is separated from the membrane lipid layer or from both the membrane lipid layer and the neutral lipid layer. In a second process, no centrifugation step is effected since the starting animal muscle proteins contain low concentrations of undesired membrane lipids, oils and/or fats. In both processes, the protein mixture is free of myofibrils and sarcomeres. In both processes, the pH of the protein-rich aqueous phase can be lowered to a pH about 3.5 or below, preferably between about 2.5 and 3.5. In both processes, the protein in the aqueous acidic solution is recovered after centrifugation (when used) or by drying the aqueous acidic protein solution, such as by evaporation, spray drying or lyophilization to form a powder product having the low pH it had when it was dissolved in the aqueous acidic solution. The aqueous acidic protein solution or dry protein composition then is mixed with an enzyme that converts the protein to a peptide composition. The peptide composition then can be dried such as by evaporation, lyophilization or spray drying or it can be retained as an aqueous acidic peptide solution which can be applied directly to the meat, fish or vegetable prior to cooking it. The protein in aqueous basic solution having a pH above 8.5 and recovered after centrifugation (when used) can be mixed with an acid to reduce its pH and can be dried, such as by spray drying or lyophilization to form a powder. In one aspect of these two other processes, the pH of the basic solution can be lowered to about 5.5 to precipitate the protein. The pH of the precipitated protein then is raised to between 6.5 and 8.5 and a solid product is recovered such as by drying including spray drying, lyophilization or evaporation or which can be comminuted and converted to the peptide composition with an enzyme. The peptide composition described above then is added to the uncooked fish, meat, poultry or vegetable. The precipitated protein can be mixed with a pharmaceutically acceptable or food grade acid to form an aqueous acidic protein solution of a desired viscosity. The latter process is particularly suitable for forming an aqueous acidic protein solution that can be converted to a peptide solution with an enzyme and then injected into the uncooked food.

The peptide composition derived from the dry protein mixture or the aqueous acidic protein solution is applied to, admixed with and/or injected into the uncooked food. The peptide composition can be applied alone or in admixture with conventional food or nutritive additives such as breading or batter coatings, spice dry rubs, cracker meal, corn meal or the like. It is preferred to utilize the aqueous acidic peptide solution, with or without food or nutritional additives, for injection. The dry peptide mixture and/or aqueous peptide solution can be coated on the surface of the uncooked meat, fish or vegetable with an applicator or can be coated by tumbling or immersing the uncooked meat, fish or vegetable in the solution or in a marinade containing the acidic aqueous peptide solution or dry acidic protein mixture in a container or in a tumbling or vacuum tumbling apparatus.

In summary, the dry protein mixture or the aqueous acidic protein solution utilized to form the peptide composition utilized in the present invention can be obtained by the following methods:

1. Reduce the pH of comminuted animal muscle tissue to a pH less than about 3.5 to form an acidic protein solution, centrifuge the solution to form a lipid-rich phase and an aqueous phase and recover an aqueous acidic protein solution substantially free of membrane lipids that can be used in this invention.

2. Spray dry the aqueous acidic protein solution obtained by method 1 to form a dry protein mixture substantially free of membrane lipids that can be used in the present invention.

3. Lyophilize the aqueous acidic protein solution obtained by method 1 to form the dry protein mixture substantially free of membrane lipids that can be used in the present invention.

4. Increase the pH of the aqueous acidic protein solution from method 1 to about pH 5.0–5.5 to effect precipitation of the proteins and then readjust the protein back to a pH of about 4.5 or less using acid in a minimum volume to concentrate the aqueous acidic protein solution to between 1.6–15% protein.

5. Reduce the pH of comminuted animal muscle tissue to form an aqueous acidic protein solution that can be used in the present invention.

6. Spray dry the aqueous acidic protein solution obtained by method 5 to form the dry protein mixture that can be used in the present invention.

7. Lyophilize the aqueous acidic protein solution obtained by method 5 to form the dry protein mixture that can be used in the present invention.

8. Increase the pH of the aqueous acidic protein solution from method 5 to about pH 5.0–5.5 to effect precipitation of the proteins and then readjust the protein back to a pH of about 4.5 or less using acid in a minimum volume to concentrate the aqueous acidic protein solution to between about 1.6–15% protein.

9. Increase the pH of comminuted animal muscle tissue to a pH above about 10.5, centrifuge the solution to form a lipid-rich phase and an aqueous phase and recover an aqueous basic protein solution. In one embodiment, reduce the pH of the aqueous basic solution to a pH of less than about 3.5 to obtain an aqueous acidic protein solution substantially free of membrane lipids that can be used in this invention. In a second embodiment, reduce the pH of the aqueous basic solution to about 5.0–5.5 to precipitate the protein, raise the pH of the precipitated protein to 6.5–8.5, dry and comminute the protein. In a third embodiment, reduce the pH of the aqueous basic solution to about 5.0–5.5 to precipitate the protein, lower the pH of the precipitated protein to a pH of 4.5 or less to form a concentrated aqueous acidic solution and use the concentrated aqueous acidic solution or dry the solution and use the recovered dry protein.

10. Spray dry the aqueous acidic protein solution obtained by method 9 to form a dry acidic protein mixture substantially free of membrane lipids that can be used in the present invention.

11. Lyophilize the aqueous acidic protein solution obtained by method 9 to form the dry acidic protein mixture substantially free of membrane lipids that can be used in the present invention.

12. Increase the pH of the aqueous, acidic protein solution from method 9 to about pH 5.0–5.5 to effect precipitation of the proteins and then readjust the protein back to a pH of about 4.5 or less using acid in a minimum volume to concentrate the aqueous acidic solution to between 1.6–15% protein.

13. Increase the pH of comminuted animal muscle tissue to a pH above about 10.5 to form an aqueous basic protein solution. In one embodiment, reduce the pH of the basic solution to below about 3.5 to form an aqueous acidic protein solution that can be used in the present invention. In a second embodiment, reduce the pH of the aqueous basic solution to about 5.0–5.5 to precipitate the protein, raise the pH of the precipitated protein to 6.5–8.5, dry and comminute the protein. In a third embodiment, reduce the pH of the aqueous basic solution to about 5.0–5.5 to precipitate the protein, raise the pH of the precipitated protein to 6.5–8.5, dry and comminute the protein. In a third embodiment, reduce the pH of the aqueous basic solution to about 5.0–5.5 to precipitate the protein, lower the pH of the precipitated protein to a pH of 4.5 or less to form a concentrated aqueous acidic solution and use the concentrated aqueous acidic solution or dry the solution and use the recovered dry protein.

14. Spray dry the aqueous acidic solution obtained by method 13 to form a dry acidic protein mixture that can be used in the present invention.

15. Lyophilize the aqueous acidic solution obtained by method 13 to form the dry acidic protein mixture that can be used in the present invention.

It is preferred to utilize a peptide composition derived from the protein mixture having a pH between about 2.5 and 3.5. As set forth above, the peptide composition can be utilized alone or can be mixed with a protein composition derived from animal muscle tissue described above and then added to the uncooked food for the purpose of retaining moisture in cooked food.

The starting protein is derived from meat or fish, including shellfish. Representative suitable fish include deboned flounder, sole haddock, cod, sea bass, salmon, tuna, trout or the like. Representative suitable shellfish include shelled shrimp, crayfish, lobster, scallops, oysters or shrimp in the shell or like. Representative suitable meats include beef, lamb, pork, venison, veal, buffalo or the like; poultry such as chicken, mechanically deboned poultry meat, turkey, duck, a game bird or goose or the like.

In accordance with this invention, the dry protein mixture or aqueous solution of myofibrillar proteins and sarcoplasmic protein is mixed with one or more enzymes, which convert the protein to peptides. The enzymes can be exoproteases and can be active to produce peptides at an acidic pH, an alkaline pH or a neutral pH. Representative suitable enzymes useful at acidic pH include Enzeco Fungal Acid Protease (Enzyme Development Corp., New York, N.Y.; Newlase A (Amano, Troy, Va.); and Milezyme 3.5 (Miles Laboratories, Elkhart, Ind.) or mixtures thereof. Representative suitable enzymes useful at alkaline pH include Alcalase 2.4 LFG (Novozyes, Denmark). Representative suitable enzymes useful at neutral pH include Neutrase 0.8L (Novozymes, Denmark) and papain (Penta, Livingston, N.J.) or mixtures thereof.

The enzymes utilized in amounts of between about 0.02% and about 2% preferably between about 0.05% and about 0.5% by weight based on the total weight of enzyme and protein at temperatures between about 4° C. and about 55° C., preferably between about 25° C. and about 40° C., for a time between about 5 mins and about 24 hrs., preferably between about 0.5 hrs. and about 2 hrs. The peptides formed by reaction of the protein composition with the enzyme composition then are recovered by drying the solution wherein the reaction takes place. Drying can be effected by evaporation, spray drying, freeze-drying or the like. The peptides produced by the present invention are instantaneously soluble in water at neutral pH.

The peptide products utilized in the invention typically contain less than about 1 weight percent fats and oils (total), preferably less than about 0.2% weight percent fats and oils based on the weight of peptide. In addition, the peptide products utilized in the present invention typically contain less than about 2 weight percent ash, preferably less than about 0.2% weight percent fats and oils based on the weight of peptide. This low ash content can be achieved by washing with water the protein starting material. Ash is defined as minerals, such as sodium, potassium, calcium, iron or phosphorous. In addition, the peptide products of this invention are instantly soluble in water to form a clear solution. Furthermore, the peptide products of this invention generally have lighter color whiteness units than the color whiteness units of a similar unhydrolyzed protein isolate from which they are derived as measured by a calorimeter with L, a, b capabilities. This lighter color is found with the hydrolyzed peptides of this invention derived from meats such as beef, pork or chicken as well as from dark muscle tissue from fish such as pelagic fish as shown, for example, in Example 1 below. This lighter color characteristic is desirable since it more easily permits dissolving the peptide product in water to form clear aqueous solutions.

Color whiteness index is determined by converting the L, a, b values utilizing the formula: $100\,[(100-L)^2+a^2+b^2]^{0.5}$. Color is measured using a tristimulus calorimeter utilizing the universally adopted "L, a, b" opponent-type scale developed by Richard Hunter as is well known in the art. "L" is a measure of light ranging from white to black. The "a" value measures the range from green to red, and the "b" value measures the range from blue to yellow. With these three coordinates, a three-dimensional value can be assigned to any color.

The protein products utilized to form the peptide composition utilized in the present invention comprise primarily myofibrillar proteins that also contains significant amounts of sarcoplasmic proteins. The sarcoplasmic proteins in the protein product utilized to form the peptide composition added to fish, meat, poultry or vegetable comprises above about 8%, preferably above about 10%, more preferably above about 15% and most preferably above about 18%, up to about 30% by weight sarcoplasmic proteins, based on the total weight of protein in the dry acidic protein mixture or aqueous acidic protein solution.

In accordance with this invention the dry peptide mixture derived from a mixture of myofibrillar proteins and sarcoplasmic proteins, in powder form, small coarse particle or dehydrated form is applied to the surface of animal muscle tissue or vegetable to be cooked, or is mixed with the animal muscle or vegetable tissue to be cooked such as hamburger, sliced reformulated beef or sausage. The term "a surface" as used herein is a surface of the fish or meat which is positioned 90 degrees from an adjacent surface or surfaces of the meat or fish. In addition, the term "a surface" can comprise the connecting surface connecting two adjacent surfaces positioned 90 degrees from each other. Preferably, the entire surface of the meat, fish, poultry or vegetable is coated with the dry acidic protein mixture or aqueous acidic protein solution. The coated fish, meat, poultry or vegetable then can be cooked at elevated temperature while retaining a substantial majority of its original moisture.

In one aspect of this invention, particulate meat or fish such as ground meat or fish, e.g. hamburger, is mixed with the dry peptide mixture derived from a protein mixture comprising myofibrillar proteins and sarcoplasmic proteins at a weight ratio usually comprising about 0.03 to about 18% weight of the protein mixture based on the weight of the uncooked meat, fish or vegetable, preferably between about 0.5 and 10% weight based on the weight of uncooked meat, fish, poultry or vegetable and most preferably comprising between about 0.5 to about 5% weight based on the weight of the uncooked food. In addition, the aqueous acidic peptide solution can be added to the meat, fish, poultry or vegetable in the same ratios based on the weight of peptide in the solution. In addition, the dry peptide mixture or aqueous acidic peptide can be added as a mixture with the protein composition described above at the same weight % based on the weight of uncooked food. When the dry peptide mixture and/or aqueous acidic peptide solution is applied to at least one surface of the meat, fish, poultry or vegetable or it is applied by injection, the amount of the peptide mixture added is the same weight ratio as set forth above when mixed with ground meat or fish. When utilizing less than about 0.03% weight dry peptide mixture or aqueous acidic peptide solution, effective moisture retention is not observed. When utilizing greater than about 15% weight dry peptide mixture or aqueous acidic peptide solution, the cooked meat, fish or vegetable can become undesirably hard.

The animal muscle tissue which is modified in accordance with this invention comprises meat, poultry or fish, including shell fish. Representative suitable fish include deboned flounder, sole, haddock, cod, sea bass, salmon, tuna, trout or the like. Representative suitable shell fish include shelled shrimp, crabmeat, crayfish, lobster, scallops, oysters, or shrimp in the shell or the like. Representative suitable meats include ham, beef, lamb, pork, venison, veal, buffalo or the like; poultry such as chicken, mechanically deboned poultry meat, turkey, duck, a game bird or goose or the like either in fillet form or in ground form such as hamburg. Representative suitable vegetables include potato and onion. The meats can include the bone of the animal when the bone does not adversely affect the edibility of the meat such as spare ribs, lamb chops or pork chops. In addition, processed meat products which include animal muscle tissue such as a sausage composition, a hot dog composition, emulsified product or the like can be coated, injected or mixed with the dry acidic peptide mixture and/or the aqueous acidic peptide solution, or a combination of these peptide addition methods. Sausage and hot dog compositions include ground meat or fish, herbs such as sage, spices, sugar, pepper, salt and fillers such as dairy products as is well known in the art.

The fish, meat, poultry or vegetable containing the dry peptide mixture or aqueous acidic peptide solution either alone or in admixture with the protein composition described above then can be cooked in a conventional manner such as by baking, broiling, deep fat frying, pan frying, in a microwave oven or the like. It has been found that the cooked meat, fish or vegetable provided in accordance with this invention weighs between about 4% and about 21%, more usually between about 4% and about 9% by weight greater than cooked untreated meat, fish or vegetable starting from the same uncooked weight.

The following examples illustrate the present invention and are not intended to limit the same. Percent (%) in Tables 1–8 reflects the comparative loss of moisture in the controls verses the moisture loss in the compositions of this invention (moisture content of a composition of this invention/moisture content of control X 100).

EXAMPLE 1

Incorporation (Chicken Protein Isolate-Acid)

Chicken protein isolate from myofibrillar and sarcoplasmic proteins was produced according to U.S. Pat. No. 6,005,073 (low pH) from chicken breast muscle; and freeze-dried until it contained approximately 5% moisture. The aqueous acidic protein solution from which the dry protein mixture was obtained had a pH of 2.68. The dry protein mixture (protein isolate) was incorporated into fresh, ground beef (75% lean) by hand kneading for 1 min and shaped into hamburgers of uniform size. To approximately one-quarter lb. of beef (exactly weighed) was added 0–1.5 grams of the dried protein isolate. The hamburgers were pan-fried on an Iwatani (Tokyo, Japan) portable butane grill on high temperature for a total of 15 min (10 min then flipped and additional 5 min). The internal centers of the hamburgers reached 150° F.±2° F. after cooking. The cooked hamburgers were drained on paper towels for twenty seconds prior to weighing (two decimal places).

TABLE 1

| Muscle (g) Tissue (Hamburger) | Protein isolate (g) | Start wgt (g) | End wgt. (g) | Cooking loss (%) | Favorable difference in hamburger gain* Pct. Pts./% |
|---|---|---|---|---|---|
| 113.17 | 0.00 | 113.17 | 70.93 | 37.32 | control |
| 113.13 | 1.00 | 114.13 | 82.26 | 27.92 | 9.40/134 |
| 113.02 | 1.50 | 114.52 | 84.11 | 26.55 | 10.77/141 |

*versus control, not including the weight of the protein isolate

The hamburgers containing from 1–1.5 g protein isolate had improved color, were shiny in appearance on the hamburger's interior, and had much greater juiciness and better mouth-feel than the control. No discernable differences were found between the exterior surfaces of the control (0.00 g. Protein isolate) or the samples with added protein isolate.

EXAMPLE 2

Incorporation (Cod Protein Isolate-Acid)

Cod protein isolate from myofibrillar and sarcoplasmic proteins was produced according to U.S. Pat. No. 6,005,073 (low pH) from fresh Atlantic cod muscle. The aqueous acidic protein solution recovered was adjusted to pH 5.5 to enact protein precipitation. The pH of the precipitate was then raised to pH 7.04 and freeze-dried until it contained approximately 7% moisture. The dry protein mixture (protein isolate) was incorporated into fresh, ground beef (75% lean) by hand kneading for 1 min and shaped into hamburgers of uniform size. To approximately one-quarter lb. of beef (exactly weighed) was added 0–1.5 grams of dried protein isolate. The hamburgers were pan-fried on an Iwatani (Tokyo, Japan) portable butane grill on high temperature for a total of 15 min (10 min then flipped and additional 5 min). The internal centers of the hamburgers reached 155° F.±2° F. after cooking. The cooked hamburgers were drained on paper towels for twenty seconds prior to weighing (two decimal places).

TABLE 2

| Muscle (g) | Protein isolate (g) | Start wgt (g) | End wgt. (g) | Cooking loss (%) | Favorable difference in hamburger gain* Pct. Pts./% |
|---|---|---|---|---|---|
| 113.05 | 0.00 | 113.05 | 81.40 | 28.00 | control |
| 113.01 | 0.50 | 113.51 | 89.64 | 21.03 | 6.97/133 |
| 112.92 | 1.00 | 113.92 | 88.49 | 22.32 | 5.68/125 |
| 113.08 | 1.50 | 114.58 | 89.68 | 21.73 | 6.27/129 |

*Versus control, not including the weight of the protein isolate

The hamburgers containing from 0.5–1.5 g protein isolate had improved color, were shiny in appearance on the hamburger's interior, and had much greater juiciness and better mouth-feel than the control. No discernable differences were found between the exterior surfaces of the control (0.00 g. Protein isolate) or the samples with added protein isolate.

EXAMPLE 3

Incorporation (Chicken Protein Isolate-Alkaline)

Chicken protein isolate from myofibrillar and sarcoplasmic proteins was produced according to U.S. Pat. No. 6,136,959 (high pH) from chicken breast muscle. A dry protein isolate was obtained by precipitation at a pH of 5.5 followed by a readjustment of the precipitate pH to pH 7.12 and subsequently freeze dried. The dry protein mixture (protein isolate) was incorporated into fresh, ground beef (80% lean) by hand kneading for 1 min and shaped into hamburgers of uniform size. To beef (exactly weighed) was added 0 and 4.0 grams of dried protein isolate. The hamburgers were cooked on high in a Sharp Carousel (1000 watt) microwave oven for a total of 110 seconds (no flipping). The internal centers of the hamburgers reached 183° F.±4° F. after cooking. The cooked hamburgers were drained on paper towels for twenty seconds prior to weighing (two decimal places).

TABLE 3

| Muscle (g) | Protein isolate (g) | Start wgt (g) | End wgt. (g) | Cooking loss (%) | Favorable difference in hamburger gain* Pct. Pts./% |
|---|---|---|---|---|---|
| 98.64 | 0.00 | 98.64 | 59.60 | 39.58 | control |
| 98.59 | 4.00 | 102.59 | 70.86 | 30.93 | 7.26/128 |

*Versus control, not including the weight of the protein isolate

The hamburger containing 4 g protein isolate had improved color, was shiny in appearance on the hamburger's interior, and had much greater juiciness and better mouth-feel than the control (0.00 g. Protein isolate). No discernable differences were found between the exterior surfaces of the control or the samples with added protein isolate.

EXAMPLE 4

Incorporation (Chicken Protein Isolate-Acid—Adjusted to pH 5.5)

Chicken protein isolate from myofibrillar and sarcoplasmic proteins was produced according to U.S. Pat. No. 6,005,073 (low pH) from fresh chicken muscle and readjusted to pH 5.5. Moisture content of the precipitate was 74%. The protein isolate was chopped in a Waring food processor for 20 seconds to reduce size and was incorporated into fresh, ground chicken breast by hand kneading for 1 min prior to being shaped into patties of uniform size. The chicken pieces were cooked on high in ZipLock® disposable containers in a Sharp Carousel (1000 watt) microwave oven for 20 seconds, flipped and microwaved an additional 20 seconds. The internal centers of the chicken pieces reached 190° F.±0° F. after cooking. The cooked chicken pieces were drained on paper plates prior to weighing (two decimal places).

TABLE 4

| Muscle (g) | Protein isolate (g) | Start wgt (g) | End wgt. (g) | Cooking loss (%) | Difference in hamburger gain* Pct. Pts./% |
|---|---|---|---|---|---|
| 53.93 | 0.00 | 53.93 | 46.63 | 13.54 | control |
| 55.18 | 1.04 | 56.22 | 47.59 | 15.35 | −1.81/85 |
| 54.09 | 2.68 | 56.77 | 47.69 | 15.99 | −2.45/85 |
| 53.45 | 4.09 | 57.54 | 49.89 | 13.30 | 0.24/102 |

*Versus control, not including the weight of the protein isolate

Both the coated sample and the control had visible pooled water around them after cooking and were very similar in appearance. This example illustrates that a substantially neutral pH form of the protein isolate produced by the process of U.S. Pat. No. 6,005,073 is not useful in the present invention.

EXAMPLE 5

Coating (Chicken Protein Isolate-Acid)

Chicken protein isolate from myofibrillar and sarcoplasmic proteins was produced according to U.S. Pat. No. 6,005,073 (low pH) from chicken breast muscle. A dry protein isolate was obtained by precipitation at a pH of 5.5 followed by a readjustment of the precipitates to pH 6.73 and subsequently was freeze-dried until it contained approximately 5% moisture. Fresh chicken breasts were cut into uniform portions, weighed and pressed into a dish containing the dry protein mixture (protein isolate) until coated (with varying amounts of coating). The coated chicken pieces were cooked on high in ZipLock® disposable containers in a Sharp Carousel (1000 watt) microwave oven for 20 seconds, flipped and microwaved an additional 20 seconds. The internal centers of the chicken pieces reached 179° F.±0°, except for the control, which reached 172° F. after cooking. The cooked chicken pieces were drained on paper plates prior to weighing (two decimal places).

TABLE 5

| Muscle (g) | Protein isolate (g) | Start wgt (g) | End wgt. (g) | Cooking loss (%) | Favorable difference in chicken gain* Pct. Pts./% |
|---|---|---|---|---|---|
| 53.05 | 0.00 | 53.05 | 45.56 | 14.12 | control |
| 49.65 | 0.97 | 50.62 | 47.62 | 5.93 | 8.19/238 |
| 53.23 | 1.27 | 54.50 | 52.34 | 3.96 | 10.16/357 |
| 49.37 | 1.75 | 51.12 | 48.86 | 4.42 | 9.70/319 |
| 51.98** | 0.77 | 52.75 | 49.92 | 5.36 | 8.76/263 |

*Versus control, not including the weight of the protein isolate
**Coated only on the top surface The chicken pieces containing between 0.97–1.75 g protein isolate had improved color, were shiny in appearance on the chicken's interior, and had much greater juiciness and better mouth-feel than the control. (0.00 g. Protein isolate). The coated pieces retained their original size and shape, whereas the control was very shape distorted. A large pool of moisture was found in the control container and very little to none in the coated pieces containers. The chicken piece coated on one-side only had slight distortion in size and a small amount of pooled moisture was found in the container after cooking.

EXAMPLE 6

Coating (Chicken, Cod, & Pork Protein Isolate-Acid)

Dry acidic protein mixtures (protein isolate) from chicken breast, Atlantic cod fillet, and pork loin containing myofibrillar and sarcoplasmic proteins were produced according to U.S. Pat. No. 6,005,073 (low pH). Dry protein isolates were obtained by precipitation at pH's about 5.5 followed by readjustment of the precipitate's pH to about neutrality. The precipitates subsequently were freeze-dried. Atlantic cod isolate was manufactured using 0.1% (of the total water weight) sodium tripolyphosphate prior to homogenization as a metal chelating antioxidant. Pieces to be coated were cut into uniform portions, weighed and pressed into a dish containing the dried protein isolates until coated (with varying amounts of coating). The coated chicken pieces were cooked on high in ZipLock® disposable containers in a Sharp Carousel (1000 watt) microwave oven at 20 second intervals until an internal temperature in the centers of the muscle pieces reached 172° F. The cooked pieces were drained on paper plates prior to weighing (two decimal places).

TABLE 6

| Material coated | Type of protein isolate | Start wgt (g) | End wgt. (g) | Cooking loss (%) | Favorable difference in material gain* Pct. Pts./% |
|---|---|---|---|---|---|
| Haddock | Cod | 63.73 | 63.01 | 1.13 | 3.98/452 |
| Haddock control | — | 49.69 | 47.65 | 5.11 | |
| Chicken | Chicken | 44.22 | 43.73 | 1.11 | 21.37/2025 |
| Chicken control | — | 42.34 | 32.82 | 22.48 | |
| Chicken | Pork | 38.20 | 36.62 | 4.14 | 9.76/336 |
| Chicken control | — | 36.69 | 31.59 | 13.90 | |
| Cod | Cod | 158.21 | 153.22 | 2.15 | 4.35/303 |
| Cod control | — | 122.93 | 114.93 | 6.51 | |
| Chicken** | Chicken | 81.04 | 71.64 | 11.60 | 6.26/154 |
| Chicken control | | 80.22 | 65.89 | 17.86 | |

*Versus control, not including the weight of the protein isolate
**Baked at 350° F. for 15 min.

The pieces containing protein isolate were shiny in appearance on the interior and had much greater juiciness and better mouth-feel than the controls (0.00 g. Protein isolate). The coated pieces retained their original size and shape, whereas the controls were very shape distorted. Large pools of moisture were found in the controls containers and very little to none in the coated pieces containers.

EXAMPLE 7

Coating (Chicken Protein Isolate-Acid—Adjusted to pH 5.5)

Protein isolate from chicken breast myofibrillar and sarcoplasmic proteins was produced according to U.S. Pat. No. 6,005,073 (low pH) and readjusted to pH 5.5. Moisture content of the precipitate was 74%. One sample was freeze-dried at pH 5.5 until a moisture content of approximately 6%. Pieces to be coated were cut into uniform portions, weighed and pressed into a dish containing the pH 5.5 protein isolates until coated (with varying amounts of coating). The coated chicken pieces were cooked on high in ZipLock® disposable containers in a Sharp Carousel (1000 watt) microwave oven at 20 second intervals until an internal temperature in the centers of the chicken pieces reached 192° F.±3° F. The sample coated with protein powder was cooked to an internal temperature of 181° F. The cooked chicken pieces were drained on paper plates prior to weighing (two decimal places).

TABLE 7

| Muscle (g) | Protein isolate (g) | Start wgt (g) | End wgt. (g) | Cooking loss (%) | Difference in chicken wgt.* Pct. Pts./% |
|---|---|---|---|---|---|
| 32.74 | 0.00 | 32.74 | 25.08 | 23.40 | control |
| 31.63 | 4.41 | 36.04 | 26.58 | 26.25 | −2.85/89 |
| 42.00 | 0.00 | 42.00 | 37.53 | 10.64 | control |
| 40.60 | 5.42 | 46.02 | 37.53 | 12.58 | −1.94/85 |
| 55.59 | 0.00 | 55.59 | 50.69 | 8.81 | control |
| 53.13** | 0.87 | 54.00 | 49.22 | 8.85 | −0.04/99 |

*Versus control, not including the weight of the protein isolate
**coated using freeze-dried protein at pH 5.5.

The pieces containing protein isolate at pH 5.5 appeared in much worse condition than the controls. The coating formed a coarse surface with a curdled milk appearance. Both the coated sample and the control had visible pooled water around them after cooking. The sample coated with dehydrated protein (pH 5.5) had an acceptable appearance comparable to other dehydrated proteins tested. As in Example 4, this example illustrates that a substantially neutral pH form of the protein composition is not useful in the present invention.

EXAMPLE 8

Inject into Chicken (Chicken Protein Isolate pH 2.8 Acid)

Protein isolate from chicken breast myofibrillar and sarcoplasmic proteins was produced according to U.S. Pat. No. 6,005,073 (low pH). The protein precipitate obtained at pH 5.5 was readjusted back to pH 2.8 using 2 M HCl. The thick consistency solution thus produced contained 3.7% protein. Chicken breast pieces to be coated were cut into uniform portions, weighed and injected using a BD 5 ml syringe (25 gauge needle) with different amounts of weighed protein (pH 2.8) solution. The injected chicken pieces were cooked on high in ZipLock® disposable containers in a Sharp Carousel (1000 watt) microwave oven at 20 second intervals until an internal temperature in the centers of the chicken pieces reached 170° F.±7° F. The cooked chicken pieces were drained on paper plates prior to weighing (two decimal places).

TABLE 8

| Muscle (g) | Protein isolate (g) | Start wgt (g) | End wgt. (g) | Cooking loss (%) | Favorable difference in chicken gain* Pct. Pts./% |
|---|---|---|---|---|---|
| 107.22 | 0.00 | 107.22 | 100.79 | 6.00 | control |
| 107.19 | 1.36 | 108.55 | 104.38 | 3.84 | 2.16/156 |
| 120.36 | 13.85 | 134.21 | 128.76 | 4.06 | 12.98/148 |

*Versus control, not including the weight of the protein isolate

The pieces containing the protein isolate in aqueous acidic solution were shiny in appearance and had much greater juiciness and better mouth-feel than the control. The injected pieces retained their original size and shape, whereas the control was very shape distorted. Two of the samples had higher end weights than their original muscle weights after cooking. Large pools of moisture were found in the control containers and very little to none in the injected pieces containers.

EXAMPLE 9

Inject into Chicken (Pork Protein Isolate pH 2.8 Acid)

Protein isolate from pork loin myofibrillar and sarcoplasmic proteins was produced according to U.S. Pat. No. 6,005,073 (low pH). The precipitate at pH 5.5 was readjusted back to pH 2.8 using 2 M HCl and 0.5% NaCl (w/w). The solution was found to be 2.25% protein. Chicken breast pieces to be coated were cut into uniform portions, weighed and injected using a BD 5 ml syringe (18 gauge needle) with protein (pH 2.8) solution. The injected chicken pieces were cooked on high in ZipLock® disposable containers in a Sharp Carousel (1000 watt) microwave oven at 20 second intervals for a total of 80 seconds. The internal temperature in the centers of the chicken pieces reached 176° F. for the control and 198° F. for the treated sample. The cooked chicken pieces were drained on paper plates prior to weighing (two decimal places).

TABLE 9

| Muscle (g) | Protein isolate (g) | Start wgt (g) | End wgt. (g) | Cooking loss (%) | Favorable difference in chicken gain* Pct. Pts./% |
|---|---|---|---|---|---|
| 61.99 | 0.00 | 61.99 | 50.79 | 18.07 | Control |
| 56.71 | 0.79 | 57.50 | 54.66 | 4.94 | 13.13/366 |

*Versus control, not including the weight of the protein isolate

The piece containing protein isolate was shiny in appearance and had much greater juiciness and better mouth-feel than the control. The injected piece retained its original size and shape. A large pool of moisture was found in the control container and very little to none in the injected piece container.

EXAMPLE 10

Fish Protein Isolate-Acid

Fish protein isolate from myofibrillar and sarcoplasmic proteins was produced according to U.S. Pat. No. 6,451,975

(low pH, no centrifugation) from fresh haddock. The aqueous protein solution was made using citric acid (0.9%) and food-grade, hydrochloric acid 2N (for fine pH adjustment) resulting in final pH of 3.50, salt 2.04 mS, and 6.0% Brix. Haddock pieces were cut into somewhat uniform portions, weighed and injected using a BD 10 ml syringe (25 gauge needle) with different amounts of weighed protein (pH 3.50) solution. The injected haddock pieces were cooked on high in ZipLock® disposable containers in a Sharp Carousel (1000 watt) microwave oven for 1 minute, 20 seconds, at 40 second intervals. The internal temperature in the centers of the haddock pieces reached approximately 142° F. The cooked haddock pieces were cooled slightly and drained on paper plates prior to weighing (two decimal places).

TABLE 10

| Muscle (g) | Protein isolate solution (g) | Cook Start wgt (g) | Cook End wgt. (g) | Cooking loss (%) | Difference in fish gain* Percentage Points. |
|---|---|---|---|---|---|
| 103.08 | 0.00 | 103.08 | 83.75 | 18.75 | Control |
| 149.19 | 0.00 | 149.19 | 126.78 | 15.02 | Control 2 |
| 142.21 | 14.78 | 156.99 | 140.25 | −1.38 | +13.64 |
| 150.68 | 18.99 | 169.67 | 154.75 | +2.70 | +17.72 |
| 123.41 | 13.61 | 137.02 | 122.19 | −0.99 | +14.03 |
| 132.03 | 12.59 | 144.62 | 132.47 | +0.33 | +15.35 |

*Versus control 2, Examples 15.02 − 1.38 = 13.64; 15.02 + 2.70 = 17.72

The injected pieces retained a great deal of their original size and shape, whereas the control shrunk to a greater extent and had a larger pool of moisture remaining in the cooking container. Two of the samples had higher end weights than their original muscle weights after cooking.

EXAMPLE 11

Coating Using Hydrolyzed Proteins to Retain Moisture

A hake protein solution was manufactured according to U.S. Pat. No. 6,451,975 and concentrated using ultrafiltration and a 500,000 NWCO membrane (Koch Membrane, Wilmington, Mass.). Hake muscle tissue was minced and mixed with phosphoric acid and ultrafiltered to form a 3.2% BRIX solution. This solution is diluted with water to form a 2.5% BRIX solution having a viscosity of 11 seconds at 36° F. using a Zahn #5 cup. The hake protein solution was incubated with proteolytic enzymes for 60 min. at 9.9° C. in beakers. The enzyme concentrations were at 0.1% (w/w). Papain (Acros Organics, Geel, Belgium) was added to the hake protein solution adjusted to pH 7.04 using 2N NaOH, and Pepsin (Fisher Chemical, Fair Lawn, N.J.) was added to the protein solution, adjusted to pH 3.06. A substantial breakdown in viscosity of the enzyme treated protein solutions occurred during the incubation period, especially with the papain samples. Using Zahn viscometers, viscosity readings, measured in Zahn seconds, were reduced by 67% in papain, and 16% in the pepsin treated samples. The hydrolyzed protein solutions were subsequently used as described below as dips for pollock.

Wedges (0.75 oz) were cut from frozen Pollock blocks and sequenced through a batter/predust/batter/bread routine using a crunchy coating system (Newly Wed Foods, Chicago, Ill.). The breaded portions (1.5 oz.) were dipped into the hydrolyzed protein solutions for approximately 1 sec and drained prior to being refrozen. The dipped frozen portions were fried on-line for 23 sec. at 375° F. using hydrogenated, soybean oil, refrozen and analyzed.

TABLE 11

| Analyte | Control no-dip | Control non-Hydrolyzed dip pH 3.06 | Hydrolyzed protein (papain) dipped pH 7.04 | Hydrolyzed Protein (pepsin) Dipped pH 3.06 |
|---|---|---|---|---|
| Moisture (%) | 53.76 | 58.33 | 64.49 | 61.19 |

As shown in Table 11, all samples were effective at retaining moisture during the frying process compared to the non-dipped control.

The invention claimed is:
1. The process for retaining moisture in uncooked food during cooking of the food which comprises:
(a) adding to said uncooked food 0.03 to 15% by weight of an additive selected from the group consisting of (a) a peptide mixture prepared by mixing an enzyme with a protein mixture selected from the group consisting of an aqueous acidic protein solution, having a pH of about 3.5 or less, of myofibrillar proteins and sarcoplasmic proteins derived from animal muscle tissue, a dry protein mixture of myofibrillar proteins and sarcoplasmic proteins derived from animal muscle tissue obtained by drying said aqueous acidic protein solution, and mixtures thereof, and (b) the peptide mixture of (a) mixed with a protein mixture selected from the group consisting of an aqueous acidic protein solution, having a pH of about 3.5 or of myofibrillar proteins and sarcoplasmic proteins derived from animal muscle tissue, a dry protein mixture of myofibrillar proteins and sarcoplasmic proteins derived from animal muscle tissue obtained by drying said aqueous acidic protein solution, and mixtures thereof said adding occurring by a method selected from the group consisting of applying said additive to at least one surface of said uncooked food, mixing said additive with said uncooked food, injecting said additive into said uncooked food and a combination of at least two of said adding methods,
and (b) cooking said uncooked food and additive from step (a).
2. The process of claim 1 wherein said additive is applied to at least one surface of said uncooked food.
3. The process of claim 1 wherein said additive is applied to all surfaces of said uncooked food.
4. The process of claim 1 wherein said additive is mixed with said uncooked food.
5. The process of any one of claims 1 or 4 wherein said food comprises animal muscle tissue included in a sausage composition.
6. The process of claim 5 wherein said aqueous acidic protein solution has a pH between about 2.5 and 3.5.
7. The process of any one of claims 1 or 4 wherein said food comprises animal muscle tissue included in a hot dog composition.
8. The process of claim 7 wherein said aqueous acidic protein solution has a pH between about 2.5 and 3.5.
9. The process of any one of claims 2, 3 or 4 wherein said additive is mixed with a food additive selected form the group consisting of a breading, a batter, a spice dry rub, cracker meal and mixtures thereof.

10. The process of claim 9 wherein said protein mixture is substantially free of animal membrane lipids.

11. The process of claim 10 wherein said food is fish.

12. The process of claim 11 wherein said aqueous acidic protein solution has a pH between about 2.5 and 3.5.

13. The process of claim 10 wherein said food is shellfish.

14. The process of claim 13 wherein said aqueous acidic protein solution has a pH between about 2.5 and 3.5.

15. The process of claim 10 wherein said food is poultry.

16. The process of claim 15 wherein said aqueous acidic protein solution has a pH between about 2.5 and 3.5.

17. The process of claim 10 wherein said food is meat.

18. The process of claim 17 wherein said aqueous acidic protein solution has a pH between about 2.5 and 3.5.

19. The process of claim 10 wherein said aqueous acidic protein solution has a pH between about 2.5 and 3.5.

20. The process of claim 9 wherein said uncooked food is fish.

21. The process of claim 20 wherein said aqueous acidic protein solution has a pH between about 2.5 and 3.5.

22. The process of claim 9 wherein said uncooked food is shellfish.

23. The process of claim 22 wherein said aqueous acidic protein solution has a pH between about 2.5 and 3.5.

24. The process of claim 9 wherein said food is poultry.

25. The process of claim 24 wherein said aqueous acidic protein solution has a pH between about 2.5 and 3.5.

26. The process of claim 9 wherein said food is meat.

27. The process of claim 26 wherein said aqueous acidic protein solution has a pH between about 2.5 and 3.5.

28. The process of claim 9 wherein said aqueous acidic protein solution has a pH between about 2.5 and 3.5.

29. The process of claim 1 wherein said additive is injected into said uncooked food.

30. The process of any one of claims 1, 2, 3, 4 or 29 wherein said uncooked food is fish.

31. The process of claim 30 wherein said protein mixture is substantially free of animal membrane lipids.

32. The process of claim 31 wherein said aqueous acidic protein solution has a pH between about 2.5 and 3.5.

33. The process of claim 30 wherein said aqueous acidic protein solution has a pH between about 2.5 and 3.5.

34. The process of any one of claims 1, 2, 3, 4 or 29 wherein said uncooked food is shell fish.

35. The process of claim 34 wherein said shellfish is shrimp.

36. The process of claim 35 wherein said protein mixture is substantially free of animal membrane lipids.

37. The process of claim 36 wherein said aqueous acidic protein solution has a pH between about 2.5 and 3.5.

38. The process of claim 35 wherein said aqueous acidic protein solution has a pH between about 2.5 and 3.5.

39. The process of claim 34 wherein said protein mixture is substantially free of animal membrane lipids.

40. The process of claim 39 wherein said aqueous acidic protein solution has a pH between about 2.5 and 3.5.

41. The process of claim 34 wherein said aqueous acidic protein solution has a pH between about 2.5 and 3.5.

42. The process of claims 1, 2, 3, 4 or 29 wherein said uncooked food is poultry.

43. The process of claim 42 wherein said uncooked poultry is selected from the group consisting of turkey, duck, goose, game bird and chicken.

44. The process of claim 43 wherein said protein mixture is substantially free of animal membrane lipids.

45. The process of claim 44 wherein said aqueous acidic protein solution has a pH between about 2.5 and 3.5.

46. The process of claim 43 wherein said aqueous acidic protein solution has a pH between about 2.5 and 3.5.

47. The process of claim 42 wherein said protein mixture is substantially free of animal membrane lipids.

48. The process of claim 47 wherein said aqueous acidic protein solution has a pH between about 2.5 and 3.5.

49. The process of claim 42 wherein said aqueous acidic protein solution has a pH between about 2.5 and 3.5.

50. The process of any one of claims 1, 2, 3, 4 or 29 wherein said uncooked food is meat.

51. The process of claim 50 wherein said protein mixture is substantially free of animal membrane lipids.

52. The process of claim 51 wherein said aqueous acidic protein solution has a pH s between about 2.5 and 3.5.

53. The process of claim 50 wherein said aqueous acidic protein solution has a pH between about 2.5 and 3.5.

54. The process of claim 50 wherein said uncooked meat is selected from the group consisting of ham, beef, lamb, pork, veal, buffalo and venison.

55. The process of claim 54 wherein said protein mixture is substantially free of animal membrane lipids.

56. The process of claim 55 wherein said aqueous acidic protein solution has a pH between about 2.5 and 3.5.

57. The process of claim 54 wherein said aqueous acidic protein solution has a pH between about 2.5 and 3.5.

58. The process of any one of claims 1, 2, 3, 4 or 29 wherein said additive is formed from a mixture of myofibrillar proteins and sarcoplasmic proteins derived from fish muscle tissue.

59. The process of claim 58 wherein said protein mixture is substantially free of animal membrane lipids.

60. The process of claim 59 wherein said aqueous acidic protein solution has a pH between about 2.5 and 3.5.

61. The process of claim 58 wherein said aqueous acidic protein solution has a pH between about 2.5 and 3.5.

62. The process of any one of claims 1, 2, 3, 4 or 29 wherein said additive is formed from a mixture of myofibrillar proteins and sarcoplasmic proteins derived from poultry muscle tissue.

63. The process of claim 62 wherein said protein mixture is substantially free of animal membrane lipids.

64. The process of claim 63 wherein said aqueous acidic protein solution has a pH between about 2.5 and 3.5.

65. The process of claim 62 wherein said aqueous acidic protein solution has a pH between about 2.5 and 3.5.

66. The process of any one of claims 1, 2, 3, 4 or 29 wherein said additive is formed from a mixture of myofibrillar proteins and sarcoplasmic proteins derived from meat muscle tissue.

67. The process of claim 66 wherein said additive is formed from a mixture of myofibrillar proteins and sarcoplasmic proteins derived from meat muscle tissue selected from the group consisting of beef, lamb, pork and mixtures thereof.

68. The process of claim 67 wherein said aqueous acidic protein solution has a pH between about 2.5 and 3.5.

69. The process of claim 66 wherein said aqueous acidic protein solution has a pH between about 2.5 and 3.5.

70. The process of any one of claims 1, 2, 3, 4 or 29 wherein said protein mixture is substantially free of animal membrane lipids.

71. The process of claim 70 wherein said aqueous acidic protein solution has a pH between about 2.5 and 3.5.

72. The process of claim 1 wherein said additive is a dry peptide mixture derived from a protein mixture of myofibrillar proteins and sarcoplasmic proteins derived from animal muscle tissue.

73. The process of claim 1 wherein said additive is an aqueous acidic peptide solution prepared by mixing an enzyme with a protein mixture of myofibrillar proteins and sarcoplasmic proteins derived from animal muscle tissue.

74. The process of any one of claims 1, 2, 3, 4, 29, 72 or 73 wherein said aqueous acidic protein solution has a pH between about 2.5 and about 3.5.

* * * * *

UNITED STATES PATENT AND TRADEMARK OFFICE
CERTIFICATE OF CORRECTION

| | | |
|---|---|---|
| PATENT NO. | : 7,160,567 B2 | |
| APPLICATION NO. | : 10/976433 | |
| DATED | : January 9, 2007 | |
| INVENTOR(S) | : Stephen D. Kelleher and Peter G. Williamson | |

It is certified that error appears in the above-identified patent and that said Letters Patent is hereby corrected as shown below:

Col. 16, Line 33
Claim 1, line 16, after "3.5 or" insert --less--.

Signed and Sealed this

Thirteenth Day of March, 2007

JON W. DUDAS
*Director of the United States Patent and Trademark Office*